United States Patent
Wu et al.

(10) Patent No.: US 6,313,899 B1
(45) Date of Patent: Nov. 6, 2001

(54) HOMEOTROPIC LIQUID CRYSTAL DISPLAY WITH PROTRUSIONS COMPRISING ADDITIONAL ELECTRODES

(75) Inventors: Biing-seng Wu; Chen-lung Kuo; Chung-kuang Wei, all of Tainan County (TW)

(73) Assignee: Chi Mei Electronics Corporation, Tainan County (TW)

( * ) Notice: Subject to any disclaimer, the term of this patent is extended or adjusted under 35 U.S.C. 154(b) by 0 days.

(21) Appl. No.: 09/368,515

(22) Filed: Aug. 5, 1999

(51) Int. Cl.[7] ................................. G02F 1/1337
(52) U.S. Cl. ............................ 349/130; 349/129
(58) Field of Search ................... 349/129, 130, 349/139, 84, 191, 122, 123, 124, 125

(56) References Cited

U.S. PATENT DOCUMENTS

| | | | |
|---|---|---|---|
| 5,666,179 | * 9/1997 | Koma | 349/143 |
| 6,043,860 | * 3/2000 | Wei et al. | 349/187 |
| 6,081,315 | * 6/2000 | Matsuyama et al. | 349/143 |
| 6,097,463 | * 8/2000 | Chen | 349/130 |
| 6,097,464 | * 8/2000 | Liu | 349/130 |
| 6,115,100 | * 9/2000 | Koma | 349/181 |
| 6,188,456 | * 2/2001 | Koma | 349/113 |
| 6,188,457 | * 2/2001 | Liu | 349/124 |
| 6,256,080 | * 7/2001 | Colgan et al. | 349/129 |

* cited by examiner

Primary Examiner—William L. Sikes
Assistant Examiner—David Chung
(74) Attorney, Agent, or Firm—Bacon & Thomas, PLLC

(57) ABSTRACT

A wide viewing angle liquid crystal display is provided. The present invention includes a first substrate, a second substrate, a liquid crystal layer, a plurality of pixels, a common electrode, a plurality of protrusions, a plurality of control electrodes, a first orientation layer and a second orientation layer. The liquid crystal layer is interposed between the first substrate and the second substrate. The plurality of pixels are arranged in a matrix and disposed on the first substrate, each pixel has a pixel electrode and a switching means connected to it. The common electrode is disposed on the second substrate. The plurality of protrusions are composed of dielectric material and at least one of the plurality of protrusions is disposed on each pixel electrode. Each of the plurality of control electrodes is disposed on top of one of the plurality of protrusions. The first orientation layer overlays the homeotropic surface which covers the plurality of pixel electrodes, the plurality of protrusions, and the plurality of control electrodes. The second orientation layer overlays the surface of the common electrode.

6 Claims, 8 Drawing Sheets

HOMEOTROPIC LIQUID CRYSTAL DISPLAY WITH PROTRUSIONS COMPRISING ADDITIONAL ELECTRODES

BACKGROUND OF THE INVENTION

A. Field of the Invention

The present invention relates to a liquid crystal display (LCD), especially to a TFT (thin film transistors) active matrix LCD having satisfactory visibility in a wide viewing angle range.

B. Description of the Prior Art

Compared with the conventional cathode-ray tube (CRT), the LCD has many advantages, such as, thinner in size and lighter in weight. Nevertheless, the viewing angle characteristic of the LCD is very narrow. To relieve the viewing angle dependence of the LCD, various types of LCD have been developed, for example, IPS (In-Plane Switching) LCD. However, IPS LCD is restricted to the application of desktop computers rather than notebooks since the optical transmission rate of IPS LCD is much lower than that of conventional TN (Twisted Nematic) LCD.

To improve the viewing angle dependence, a conventional method is to provide a LCD wherein there are many orientation directions for the liquid crystal molecules in the liquid crystal layer. For instance, a conventional LCD developed by Fujitsu company is illustrated in FIGS. 6A and 6B. Refer to FIG. 6A, the LCD includes an upper glass substrate 1, a lower glass substrate 2, and a liquid crystal layer 5 interposed therebetween. A pixel electrode 3 is disposed on the upper glass substrate 1 while a partial common electrode 4 is disposed on the lower glass substrate 2. More particularly, there are multiple protrusions 6 on the pixel electrode 3 and the partial common electrode 4. An orientation layer 7 overlays the homeotropic surface which covers the pixel electrode 3 and the protrusions 6. The other orientation layer 7 overlays the homeotropic surface which covers the partial common electrode 4 and the protrusion 6.

The structure as shown in FIG. 6A illustrates the situation when no voltage is applied between the pixel electrode 3 and the partial common electrode 4 or when the voltage applied between the pixel electrode 3 and the partial common electrode 4 is lower than a threshold voltage. Under the circumstance, all liquid crystal molecules have the same orientation direction (the vertical direction in FIG. 6A). On the other hand, when the voltages applied between the pixel electrode 3 and the partial common electrode 4 exceeds the threshold voltage, the behavior of the liquid crystal molecules will vary in a manner as shown in FIG. 6B. Under the circumstance, the orientation directions of the liquid crystal molecules will be affected by the protrusions 6. Consequently, the viewing angle can be widened utilizing the LCD structure as illustrated in FIGS. 6A and 6B.

Another approach is developed by IBM and is illustrated in FIGS. 7A and 7B. Refer to FIG. 7A, the partial structure of the LCD includes an upper glass substrate 1, a lower glass substrate 2, a pixel electrode 3, a partial common electrode 4, a liquid crystal layer 5 and two orientation layers 7.

A groove 9 is formed on the partial common electrode 4, which causes discontinuities of the partial common electrode 4. When no voltage is applied between the pixel electrode 3 and the partial common electrode 4, or when the voltage applied between the pixel electrode 3 and the partial common electrode 4 does not exceed a threshold voltage, the liquid crystal molecules in the liquid crystal layer 5 have the same orientation direction, as illustrated in FIG. 7A. On the other hand, when the voltage applied between the pixel electrode 3 and the partial common electrode 4 exceeds the threshold voltage, the orientation direction of the liquid crystal molecules near the groove 9 will vary in a manner as illustrated in FIG. 7B. It is due to the non-uniform electric fields (as shown by the arrows in FIG. 7B) caused by the existence of the groove 9. Consequently, the viewing angle can also be widened utilizing the LCD structure as illustrated in FIGS. 7A and 7B.

Yet another approach is also developed by IBM and illustrated in FIG. 8. The LCD includes: an upper glass substrate 1, a lower glass substrate 2, a liquid crystal layer 5 interposed therebetween, a pixel electrode 3, a partial common electrode 4, a protrusion 6, and two orientation layers 7. The structure described in FIG. 8 can be considered to be a combination of the structures described in FIGS. 6A, 6B and FIGS. 7A, 7B. Specifically, the orientation directions of the liquid crystal molecules can be further diversified because of the two reasons: (1) the liquid crystal molecules near the protrusion 6 tend to align perpendicular to the homeotropic surface which covers the partial common electrode 4 and the protrusions 6; (2) the fringing field effect (as shown by the arrows in FIG. 8) appears at the edges of the pixel electrode 3. Consequently, the viewing angle can also be widened utilizing the LCD structure as illustrated in FIG. 8.

In summary, for the prior art as illustrated in FIGS. 6A, 6B and FIG. 8, the dielectric materials constituting the protrusions 6 must satisfy some requirements such as resistivity, dielectric constant, and shape. As for the prior art illustrated in FIGS. 7A, 7B, the fabrication processes is somewhat complicated because the groove 9 need to be formed on the partial common electrode 4.

SUMMARY OF THE INVENTION

Accordingly, it is an object of the present invention to provide a LCD having wide viewing angle by providing a structure capable of providing various orientation directions of liquid crystal molecules.

It is another object of the present invention to provide a LCD having wide viewing angle by utilizing a simple fabrication processes.

A preferred embodiment of the present invention includes a first substrate, a second substrate, a liquid crystal layer, a plurality of pixels, a common electrode, a plurality of protrusions, a plurality of control electrodes, a first orientation layer and a second orientation layer.

The liquid crystal layer is interposed between the first substrate and the second substrate. The plurality of pixels are arranged in a matrix and disposed on the first substrate, each pixel has a pixel electrode and a switching means connected to it. The common electrode is disposed on the second substrate. The plurality of protrusions are composed of dielectric material and at least one of the plurality of protrusions is disposed on each pixel electrode. Each of the plurality of control electrodes is disposed on top of one of the plurality of protrusions. The first orientation layer overlays the homeotropic surface which covers the plurality of pixel electrodes, the plurality of protrusions, and the plurality of control electrodes. The second orientation layer overlays the surface of the common electrode.

The plurality of protrusions, the voltage applied to the plurality of control electrodes, and the fringing field effect appears at the edges of the plurality of pixel electrodes altogether make the liquid crystal molecules in the liquid crystal layer have many orientation directions, which widens the viewing angle of the LCD.

Another preferred embodiment of the present invention includes a first substrate, a second substrate, a liquid crystal layer, a plurality of pixels, a common electrode, a plurality of protrusions, a plurality of control electrodes, a first orientation layer and a second orientation layer.

The liquid crystal layer is interposed between the first substrate and the second substrate. The plurality of pixels are arranged in a matrix and disposed on the first substrate, each pixel has a pixel electrode and a switching means connected to it. The common electrode is disposed on the second substrate. The plurality of protrusions are composed of dielectric material and at least one of the plurality of protrusions is disposed on the region of the common electrode corresponding to each of the plurality of pixels. Each of the plurality of control electrodes is disposed on top of one of the plurality of protrusions. The first orientation layer overlays the surface of the plurality of pixel electrodes. The second orientation layer overlays the homeotropic surface which covers the common electrode, the plurality of protrusions, and the plurality of control electrodes.

The plurality of protrusions, the voltage applied to the plurality of control electrodes, and the fringing field effect appears at the edges of the plurality of pixel electrodes altogether make the liquid crystal molecules in the liquid crystal layer have many orientation directions, which widens the viewing angle of the LCD.

BRIEF DESCRIPTION OF THE DRAWINGS

These and other objects and advantages of the present invention will become apparent with reference to the following description and accompanying drawings wherein.

DETAILED DESCRIPTION OF THE PREFERRED EMBODIMENTS

A preferred embodiment of the invention is described below. Those skilled in the art will appreciate that changes can be made to the disclosed embodiment without departing from the spirit and scope of the invention.

Figure 1:
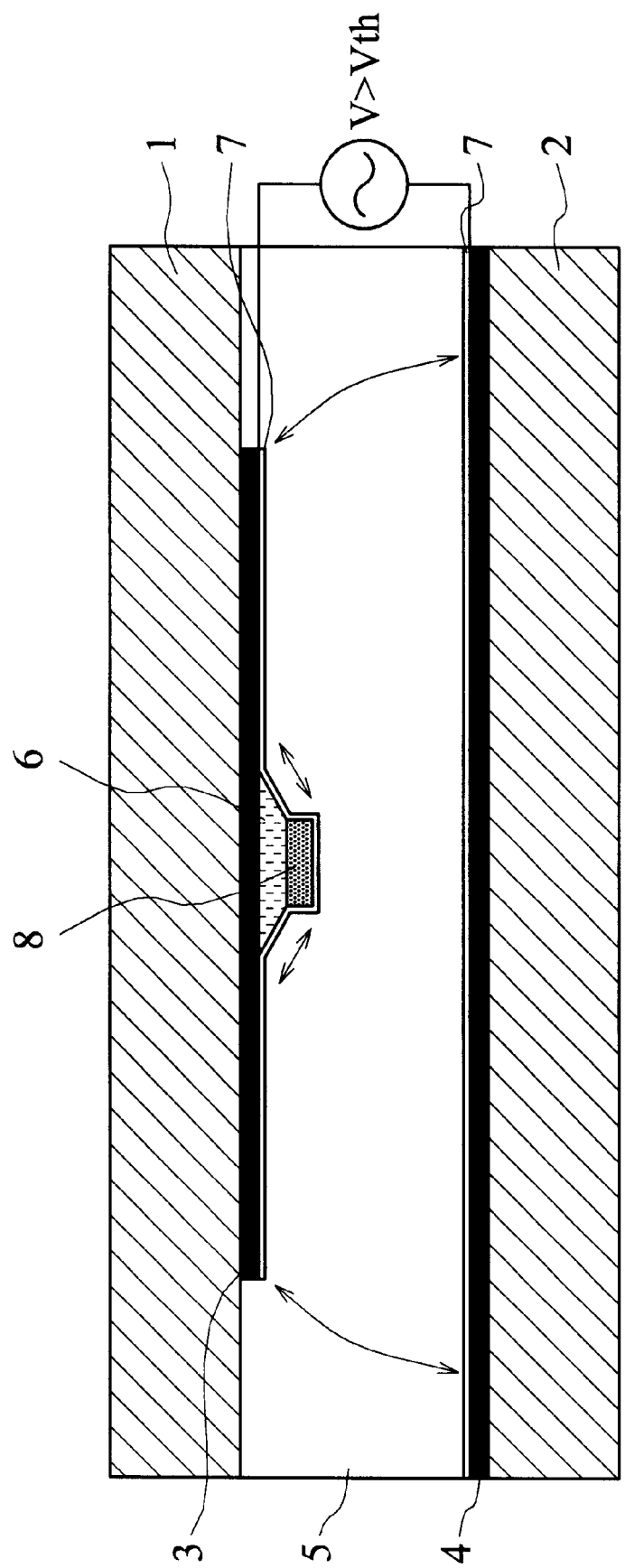
FIG. 1 is a schematic diagram showing the partial cross-sectional view of the wide viewing angle liquid crystal display according to the first preferred embodiment of the present invention.

The first preferred embodiment of the present invention can be described with reference to FIG. 1. The pixels of the TFT active matrix LCD are arranged in a matrix. FIG. 1 merely shows the corresponding portion of one pixel to illustrate the overall structure of a LCD. As illustrated in FIG. 1, the LCD in accordance with the present invention includes: an upper glass substrate 1, a lower glass substrate 2, and a liquid crystal layer 5 interposed therebetween. The pixel electrode 3 is disposed on the upper glass substrate 1. The partial common electrode 4 opposed to an associated pixel electrode 3 is disposed on the lower glass substrate 2. A protrusion 6, composed of dielectric material, is formed on the pixel electrode 3. A control electrode 8 is formed by depositing a conductor on the protrusion 6. An orientation layer 7 overlays the surface of the partial common electrode 4. The other orientation layer 7 overlays the homeotropic surface which covers the pixel electrode 3, the control electrode 8 and the protrusion 6. When a non-zero voltage is applied between the pixel electrode 3 and the common electrode 4, fringing field effect will be caused at the two edges of the pixel electrode 3, as shown by the arrows in FIG. 1. The fringing field will influence the orientation directions of liquid crystal molecules. Furthermore, when another voltage, different from the voltage between the pixel electrode 3 and the common electrode 4, is applied between the control electrode 8 and the common electrode 4, fringing field effect will be caused at the neighborhood of the protrusion 6, as shown by the arrows in FIG. 1. Again, the fringing field will influence the orientation directions of liquid crystal molecules. Because of the above reasons, the liquid crystal molecules have many orientation directions, which widens the viewing angle.

Figure 2:
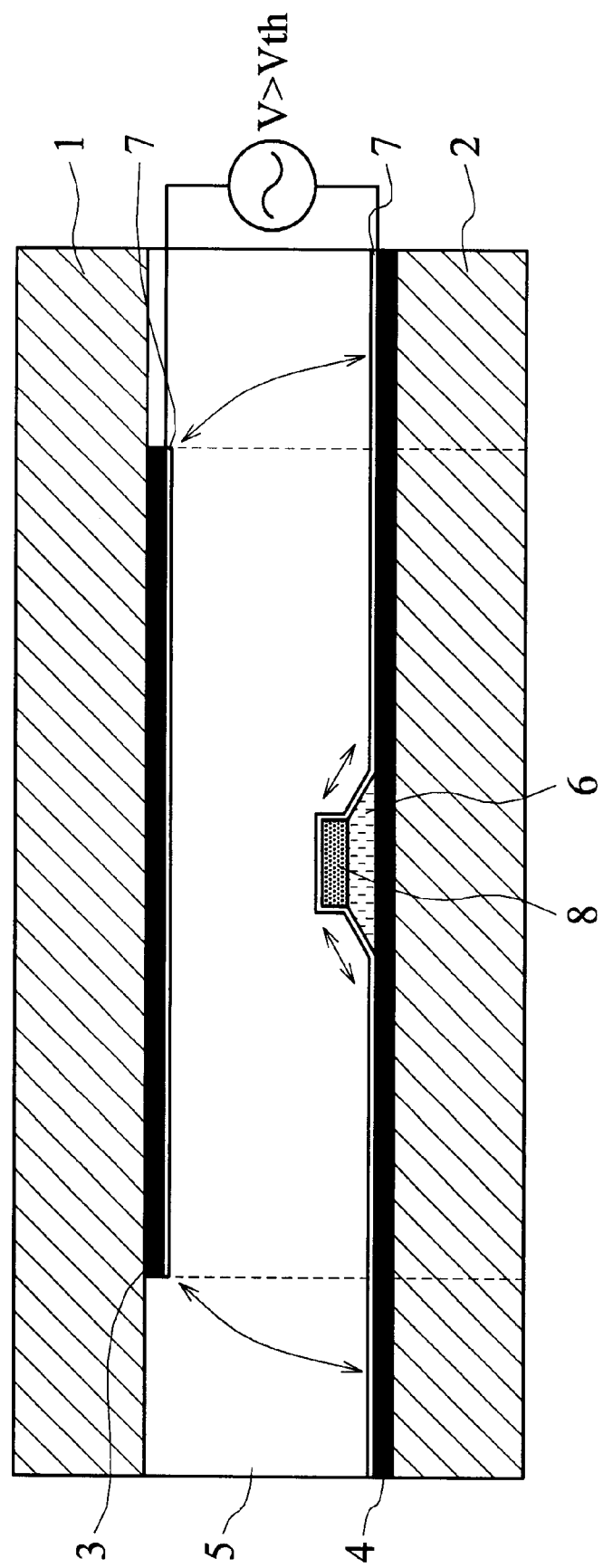
FIG. 2 is a schematic diagram showing the partial cross-sectional view of the wide viewing angle liquid crystal display according to the second preferred embodiment of the present invention.

A second preferred embodiment of the present invention can be described with reference to FIG. 2. As illustrated in FIG. 2, the LCD in accordance with the present invention includes: an upper glass substrate 1, a lower glass substrate 2 and a liquid crystal layer 5 interposed therebetween. The pixel electrode 3 is disposed on the upper glass substrate 1. The partial common electrode 4 opposed to the pixel electrode 3 is disposed on the lower glass substrate 2. A protrusion 6, composed of dielectric material, is formed on the partial common electrode 4. A control electrode 8 is formed on the protrusion 6 by depositing a conductor. An orientation layer 7 overlays the surface of the pixel electrode 3. The other orientation layer 7 overlays the homeotropic surface which covers the partial common electrode 4, the control electrode 8 and the protrusion 6. When a non-zero voltage is applied between the pixel electrode 3 and the common electrode 4, flinging field effect will be caused at the two edges of the pixel electrode 3, as shown by the arrows in FIG. 2. The flinging field will influence the orientation directions of liquid crystal molecules. Furthermore, when a non-zero voltage is applied between the control electrode 8 and the common electrode 4, fringing field effect will be caused at the neighborhood of the protrusion 6, as shown by the arrows in FIG. 2. Again, the fringing field will influence the orientation directions of liquid crystal molecules. Because of the above reasons, the liquid crystal molecules have many orientation directions, which widens the viewing angle, similar to the first preferred embodiment.

Figure 3:
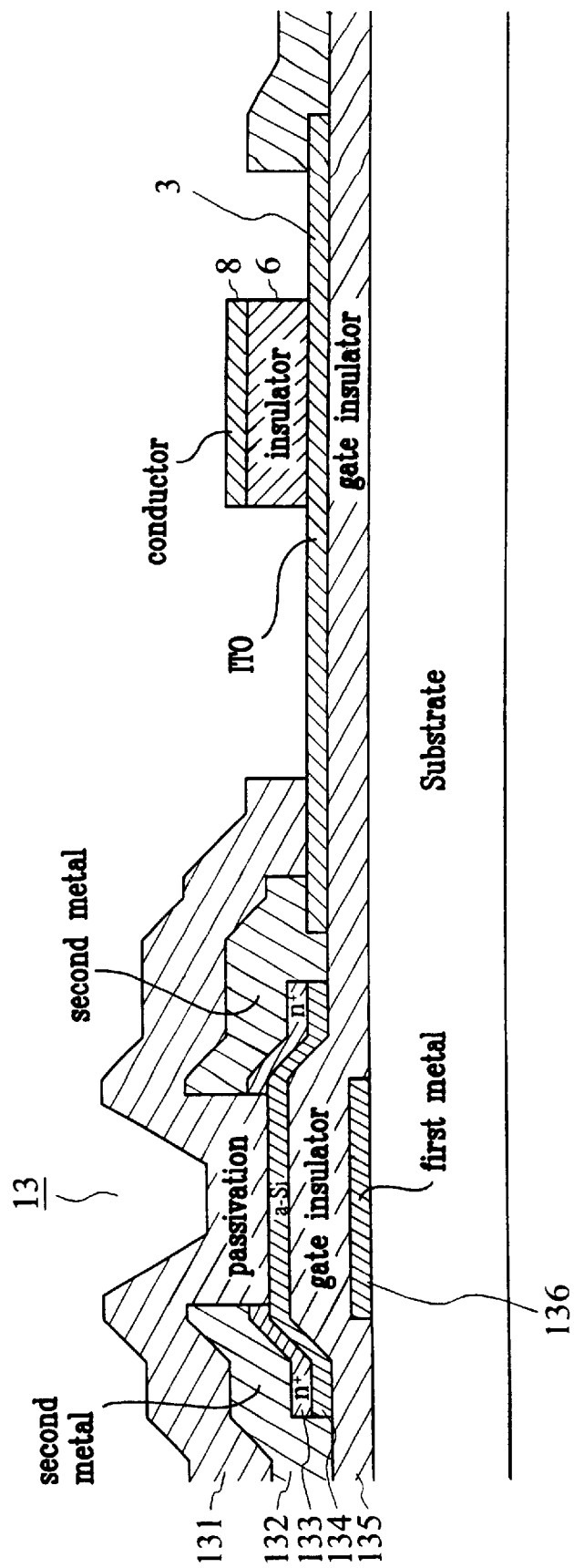
FIG. 3 is a schematic diagram showing the cross-sectional view of the semiconductor structure of the protrusion and its neighboring areas according to the first preferred embodiment of the present invention.

Referring to FIG. 3, which shows the detailed semiconductor structure of the protrusion 6 and its neighboring areas. The protrusion 6, composed of dielectric material, is disposed on the pixel electrode 3. The control electrode 8 is formed by depositing a conductor on the protrusion 6. The left half portion of FIG. 3 shows the structure of an amorphous silicon thin film transistor 13, including passivation 131, second metal 132, n⁺ region 133, amorphous silicon 134, gate insulator 135 and first metal 136.

According to the structure as shown in FIG. 3, the fabrication process of the overall structure requires 6 steps of masking processes while the fabrication process of the amorphous silicon thin film transistor on the left half portion requires only 5 steps of masking processes. The additional masking process comes from depositing the conductor (control electrode) 8 on the insulator (protrusion) 6.

Figure 4:
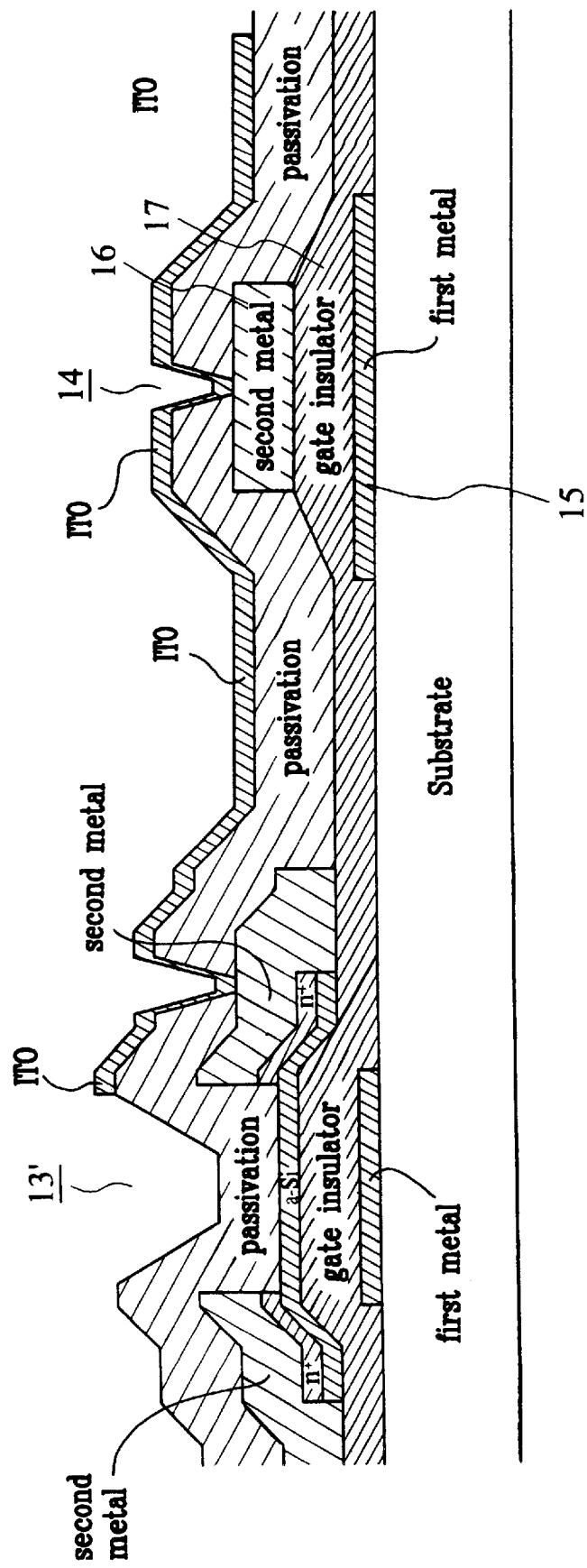
FIG. 4 is a schematic diagram showing the cross-sectional view of a conventional semiconductor structure of the liquid crystal display having a protrusion.
Figure 5:
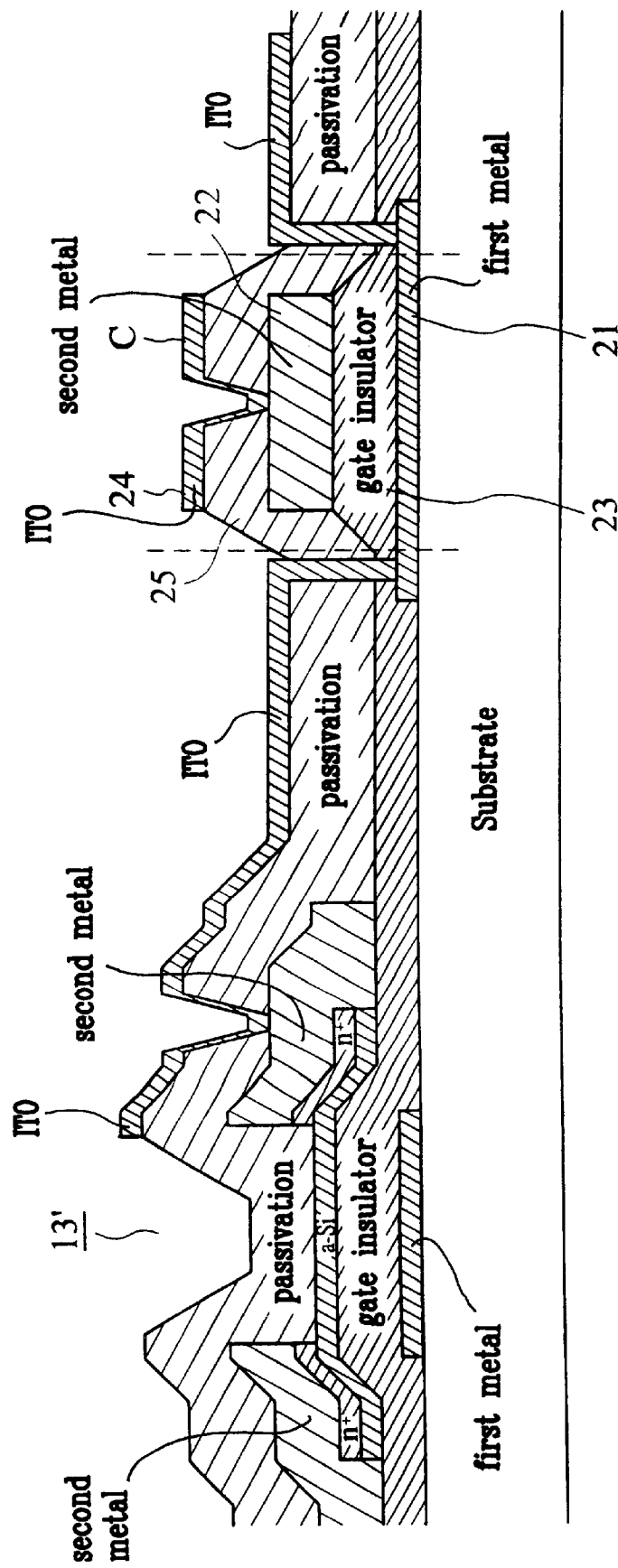
FIG. 5 is a schematic diagram showing the cross-sectional view of a semiconductor structure of the protrusion according to the preferred embodiment of the present invention.
Figure 6A:
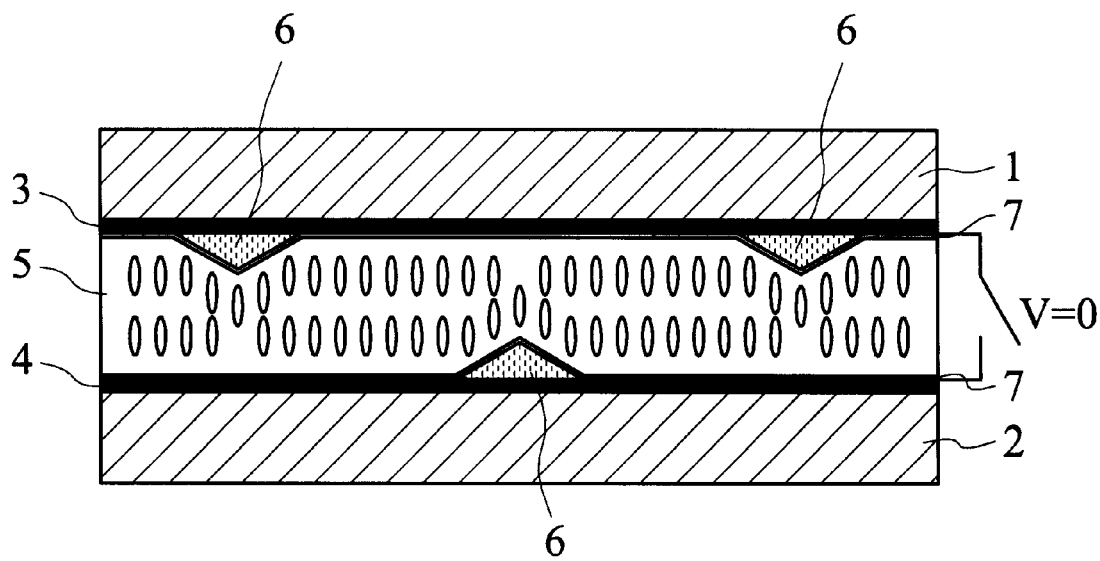
FIGS. 6 and 6B are schematic diagrams showing the partial cross-sectional views of a conventional liquid crystal display.
Figure 6B:
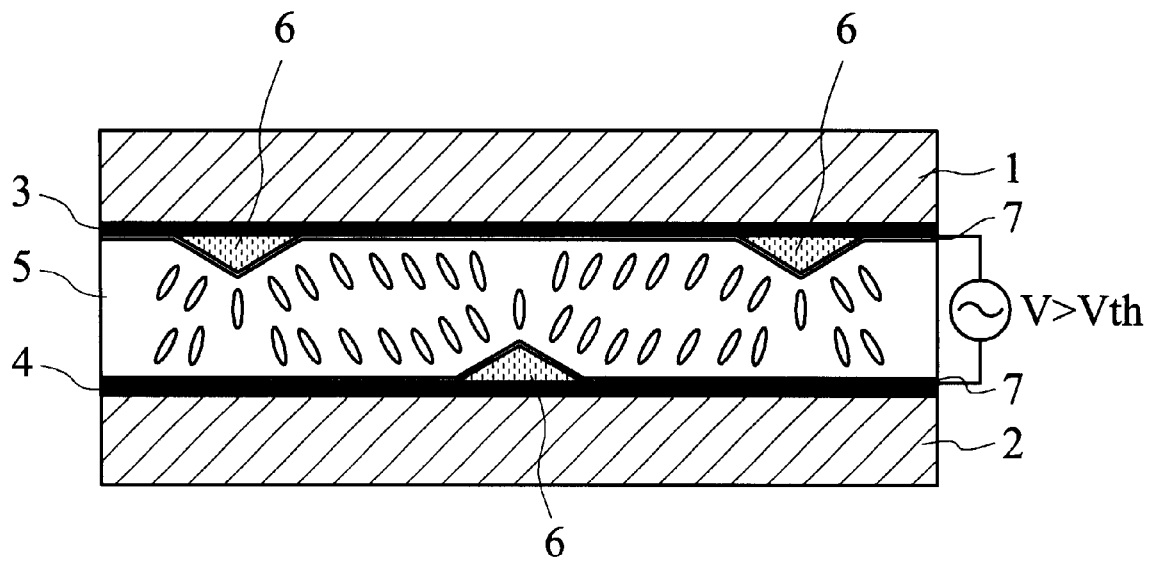
Figure 7A:
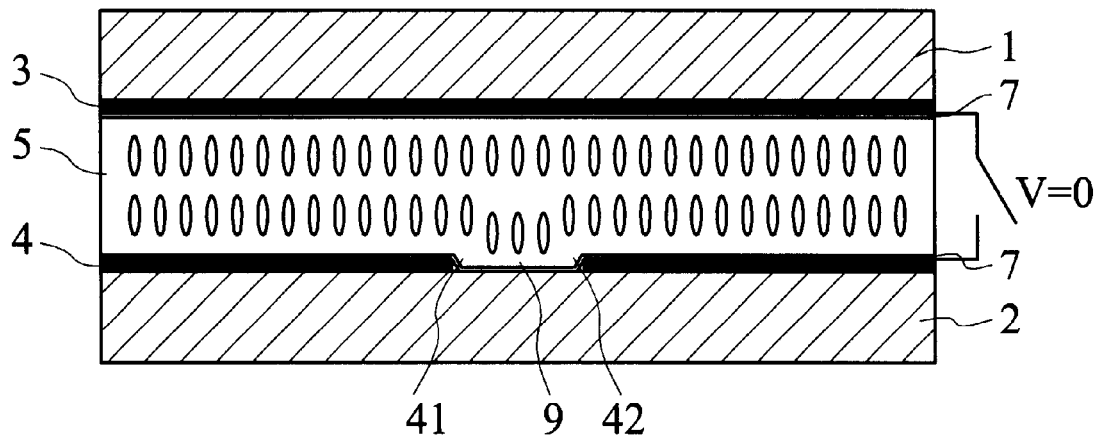
FIGS. 7A and 7B are schematic diagrams showing the partial cross-sectional views of another conventional liquid crystal display.
Figure 7B:
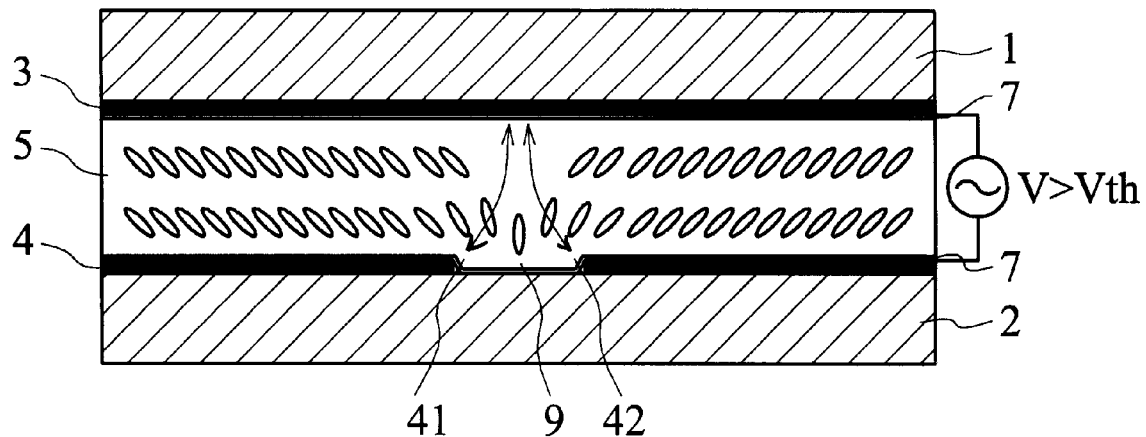
Figure 8:
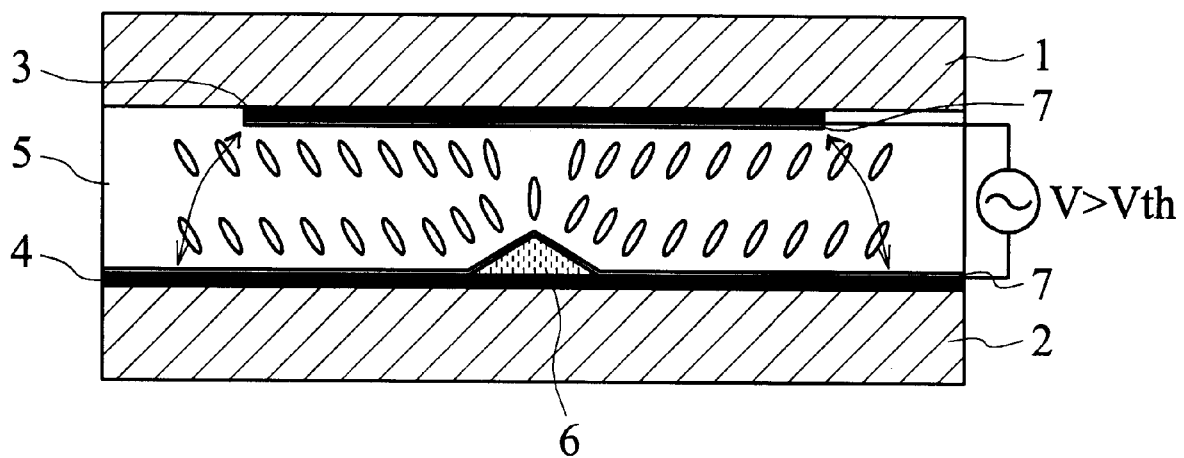
FIG. 8 is a schematic diagram showing the partial cross-sectional view of yet another conventional liquid crystal display.

FIG. 4 shows a conventional semiconductor structure of a LCD, wherein the left half portion 13' is similar to the left half portion 13 in FIG. 3, we thus omit its description. Referring to the right half portion 14 of FIG. 4, a storage capacitor is formed by the first metal 15, the second metal 16 and the gate insulator 17. The structure as shown in FIG. 4 can be modified to form a protrusion structure and a control electrode structure as described by the present invention. Referring to FIG. 5, the ITO layer 24 functions as the control electrode 8. The first metal 21, the second metal 22, the gate insulator 23 and the passivation 25 underlying the ITO layer 24 altogether constitute the protrusion structure. The semiconductor structure as shown in FIG. 5 has two advantages: (1) it has a storage capacitor constituted by the first metal 21, the second metal 22 and the gate insulator 23; (2) it requires only 5 steps of masking processes, which is one step less than the masking process required by the structure defined in FIG. 3. Accordingly, the manufacturing cost can be further reduced.

As described in conjunction with associated embodiments, the thin film transistors 13 and 24 as described in FIG. 3 and FIG. 5 function as switches for driving the pixels. Moreover, the voltage applied to the control electrodes 8 is the same as the voltage applied to the common electrode 4.

It should be understood that various alternatives to the structures described herein may be employed in practicing the present invention. It is intended that the following claims define the invention and that the structure within the scope of these claims and their equivalents be covered thereby.

What is claimed is:

1. A wide viewing angle liquid crystal display, comprising:
   a first substrate;
   a second substrate;
   a liquid crystal layer interposed between said first substrate and said second substrate;
   a plurality of pixels arranged in a matrix and disposed on said first substrate, each pixel having a pixel electrode and a switching means connected to said pixel;
   a common electrode disposed on said second substrate;
   a plurality of protrusions, each being composed of dielectric material, at least one of said plurality of protrusions being disposed on each pixel electrode;
   a plurality of control electrodes, each being disposed on top of one of said plurality of protrusions;
   a first orientation layer overlaying the homeotropic surface which covers said plurality of pixel electrodes, said plurality of protrusions, and said plurality of control electrodes;
   a second orientation layer overlaying the surface of said common electrode; and
   wherein said plurality of protrusions, the voltage applied to said plurality of control electrodes, and the fringing field effect appears at the edges of said plurality of pixel electrodes altogether make the liquid crystal molecules in said liquid crystal layer be disposed in many orientation directions, thereby relieves the viewing angle dependence.

2. The liquid crystal display as claimed in claim 1, wherein said switching means is a thin film transistor.

3. The liquid crystal display as claimed in claim 1, wherein the voltage applied to said plurality of control electrodes is the same as the voltage applied to said common electrode.

4. A wide viewing angle liquid crystal display, comprising:
   a first substrate;
   a second substrate;
   a liquid crystal layer interposed between said first substrate and said second substrate;
   a plurality of pixels arranged in a matrix and disposed on said first substrate, each pixel having a pixel electrode and a switching means connected to said pixel;
   a common electrode disposed on said second substrate;
   a plurality of protrusions, each being composed of dielectric material, at least one of said plurality of protrusions being disposed on the region of said common electrode corresponding to each of said plurality of pixels;
   a plurality of control electrodes, each being disposed on top of one of said plurality of protrusions;
   a first orientation layer overlaying the surface of said plurality of pixel electrodes; and
   a second orientation layer overlaying the homeotropic surface which covers said common electrode, said plurality of protrusions, and said plurality of control electrodes;
   wherein said plurality of protrusions, the voltage applied to said plurality of control electrodes, and the fringing field effect appears at the edges of said plurality of pixel electrodes altogether make the liquid crystal molecules in said liquid crystal layer be disposed in many orientation directions, thereby relieves the viewing angle dependence.

5. The liquid crystal display as claimed in claim 4, wherein said switching means is a thin film transistor.

6. The liquid crystal display as claimed in claim 4, wherein the voltage applied to said plurality of control electrodes is the same as the voltage applied to said common electrode.

* * * * *